United States Patent [19]
Venema

[11] 3,992,932
[45] Nov. 23, 1976

[54] TORQUE MEASURING SYSTEM
[75] Inventor: Harry J. Venema, Wheaton, Ill.
[73] Assignee: Borg-Warner Corporation, Chicago, Ill.
[22] Filed: Oct. 24, 1974
[21] Appl. No.: 517,689

[52] U.S. Cl. ................................. 73/136 R; 73/144
[51] Int. Cl.² ........................................... G01L 5/04
[58] Field of Search ........................... 73/136 R, 144

[56] References Cited
UNITED STATES PATENTS
3,598,999  8/1971  Hofmeister ...................... 73/144 X
3,679,808  7/1972  Rohner et al. .......................... 73/144

OTHER PUBLICATIONS
Gray, Trans. Am. Soc., M. E., vol. 13, 1891–1892, p. 531.
Higgs et al., Pro. Inst. C. E., vol. 52, 1877–1878, p. 54.
Thompson, J. Franklin Institute, vol. 111, Feb. 1881, p. 117.

Primary Examiner—Charles A. Ruehl
Attorney, Agent, or Firm—James J. Jennings, Jr.

[57] ABSTRACT

A measuring system indicates the tension in a belt which transfers power between driving and driven pulleys. A support member has a pair of idler rollers journalled in the proper positions to pinch the belt, thus providing a force on each idler roller. A strain gauge or mechanical spring-and-indicator is used to display the difference in forces at the two idler rollers, which difference is a function of the tension in the belt.

6 Claims, 3 Drawing Figures

FIG. 1
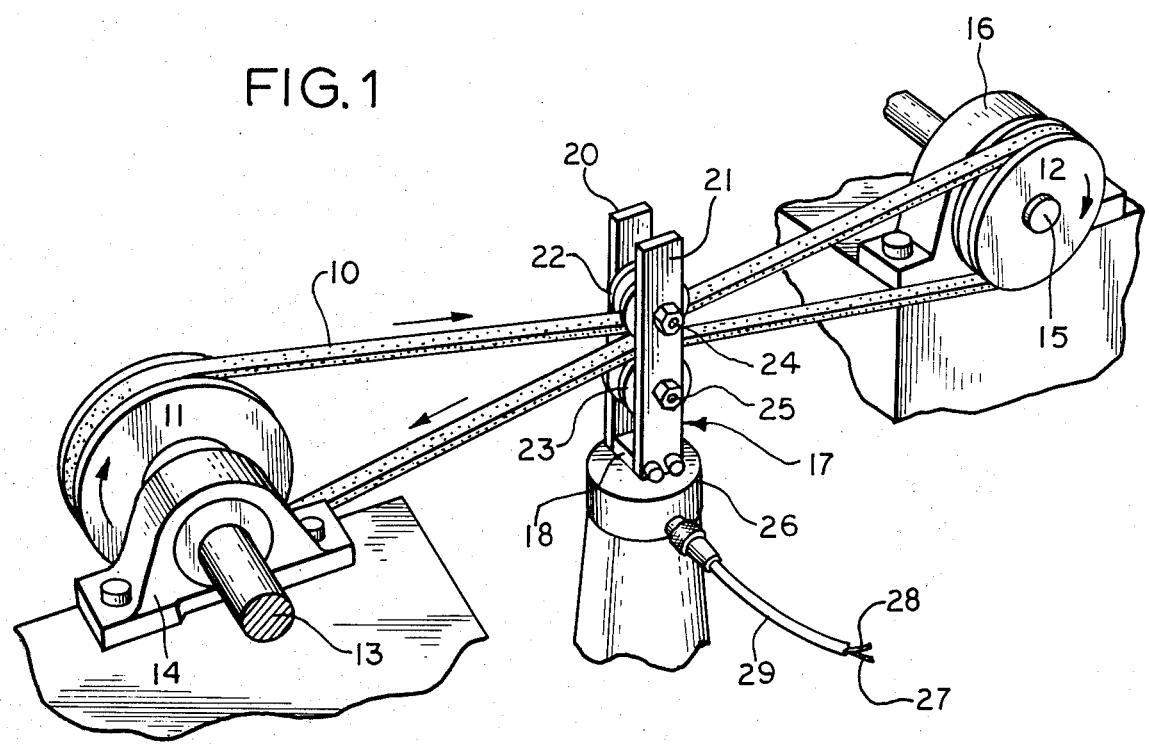
FIG. 2
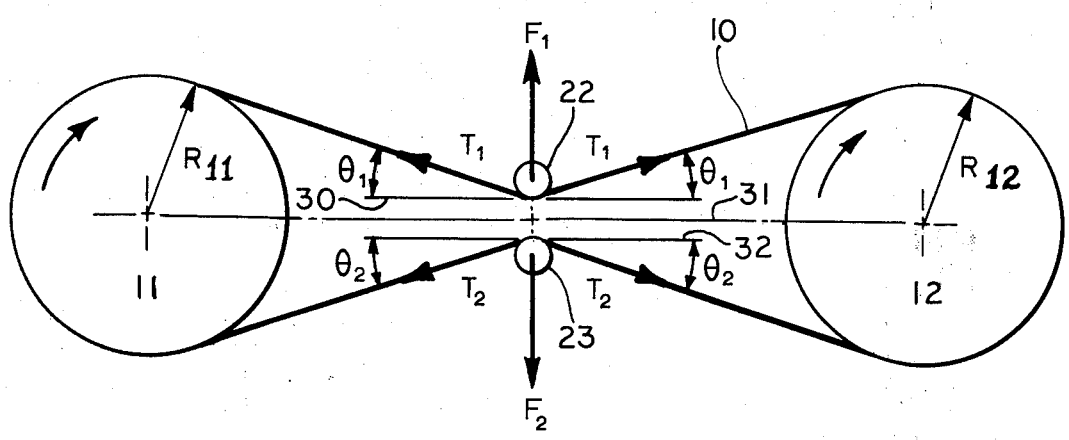
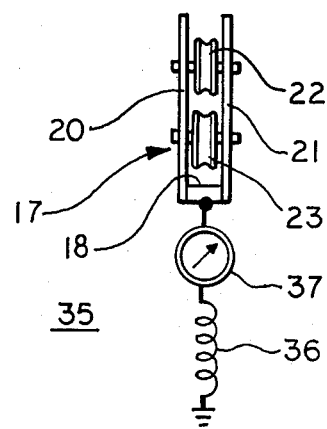
FIG. 3

TORQUE MEASURING SYSTEM

BACKGROUND OF THE INVENTION

Various devices have been suggested and built in an attempt to provide an accurate indication of the torque transmitted over a belt and pulley system. In general such arrangements have only contacted a belt or driven strand on one side. Such units generally indicate the amount of tension in the belt at the point of contact, and this may not always be a good indication of the actual torque transferred to the driven load.

It is therefore a primary consideration of the present invention to provide a torque measuring system significantly more accurate than known devices.

SUMMARY OF THE INVENTION

The measuring system of this invention develops a signal which varies as a function of the tension in a continuous strand engaging at least a portion of a driving member and at least a portion of a driven member. The system includes a support member, having a base and a pair of legs extending at substantially right angles to the base. Each of the legs defines a pair of spaced-apart openings. A pair of idler rollers is provided, each having a support shaft extending into one of the openings in each of the support member legs. Each idler roller is supported to bear against the continuous strand, such that displacement of the strand develops a differential force in each of the support member legs. A measuring means is coupled to the support member, for providing a torque-indicating signal which varies as a function of the differential force developed in the support member.

THE DRAWING

In the several figures of the drawing, like reference numerals identify like components, and in that drawing:

FIG. 1 is a perspective illustration of a preferred embodiment of the invention in combination with a known pulley and belt arrangement;

FIG. 2 is an explanatory diagram useful in understanding the operation of the system shown in FIG. 1; and FIG. 3 is a simplified illustration of another embodiment of the invention.

DETAILED DESCRIPTION OF THE INVENTION

In FIG. 1 the measuring system is shown for use in conjunction with a continuous strand, depicted as a belt 10, which engages a portion of the periphery of a driven pulley 11 and also of a driving pulley 12. Driven pulley 11 is affixed to one end of a driving shaft 13 supported in a pillow block assembly 14 in a conventional manner. In the same way driving pulley 12, which is itself driven, is affixed to a shaft 15 journalled in another pillow block bearing assembly 16. This system imparts angular displacement to any suitable load (not shown). Those skilled in the art will appreciate that the driving and driven members need not be circular pulleys, but could be triangular, octagonal, or some other configuration suitable for receiving the strand at one side and returning it around the other side of the member. In the same way the strand 10 need not be a rubber belt, as indicated, but can be a chain or other suitable unit for transferring power between the members 11, 12.

In accordance with the present invention, a generally U-shaped support member 17 is positioned in a location between the driven and driving members 11, 12. Support member 17 includes a base portion 18 and a pair of legs 20, 21 extending upwardly from the base. Support member 17 may have a configuration other than the illustrated U-shape.

A pair of idler rollers 22, 23 are provided and mounted as indicated. That is, each of the legs 20, 21 of the support member defines a pair of spaced-apart openings through which the extremities of the idler pulley shafts extend and are thus journalled. In the embodiment shown nuts 24, 25 secure the extremities of the idler pulley shaft in place. Similar nuts (not visible) are utilized on the other ends of the idler pulley shafts that extend in the other direction. The pulleys are each supported to bear against the continuous strand or belt 10, pinching or displacing the belt inwardly and thus developing a force against each of the idler pulleys. If the forces exerted against the pulleys are not equal, a differential force will be developed in each leg of support member 17, and translated to its base portion 18.

Further in accordance with the invention, measuring means 26 is coupled to the support member, to provide a torque-indicating signal which varies as a function of the differential forces developed in the legs of support member 17. In the embodiment shown measuring means 26 is a conventional strain gauge mounted adjacent and bolted to the base of support member 26 so that the differential force exerted on the gauge is translated into an electrical signal, which is passed over conductors 27 and 28 within the cable 29, extending from the strain gauge. This electrical signal can be applied to displace the movement of an electrical meter to provide a very accurate indication of the tension in the continuous belt 10, as will be better understood in considering FIG. 2.

As there shown, belt 10 intercouples pulleys 11 and 12, and the idler rollers 22, 23 pinch the belt inwardly near the center of the distance of travel between the two pulleys. Those skilled in the art will appreciate that, if the tension in belt 10 as it goes onto pulley 12 can be measured, and in addition if the tension in the belt as it leaves pulley 12 can also be measured, the total torque presented to the load will be the difference in the tensions in the belt at the two different locations, multiplied by the effective radius arm of pulley 12. To measure this, the idler pulleys 22, 23 are positioned approximately half-way between the driving and driven pulleys, and also positioned as close together as is practical, considering a reasonable clearance between the two portions of the continuous strand 10. The upper idler 22 is pushed upwardly by a force $F_1$, which is equal to the tension $T_1$ in the upper portion of belt 10 times the sine of $\theta_1$. The force $F_2$ pushing the lower idler pulley 23 downwardly is equal to the tension $T_2$ in the lower portion of belt 10 times the sine of angle $\theta_2$. It is apparent that these forces $F_1$ and $F_2$ are applied to the idler pulleys in opposite directions. Thus the total force on each leg of support member 17 holding the two idler pulleys is equal to the difference between the forces $F_1$ and $F_2$. Accordingly if the angles $\theta_1$ and $\theta_2$ are maintained equal and constant, then the force applied to the driven pulley 12 is proportional to the difference in the tensions $T_1$ and $T_2$ multiplied by the sine of $\theta$ ($\theta_1$ or $\theta_2$, as they are maintained equal). If in addition the radius arm of the pulley structure 12 is maintained constant, as it generally is, then the differential force obtained by summing the individual forces $F_1$ and $F_2$ is proportional to the torque being transmitted over the belt structure 10 to the load.

The support member 17 is provided to minimize the vertical displacement of the idler pulleys 22, 23. If such displacement is not held to a minimum, then the angles $\theta_1$ and $\theta_2$ will vary as a load is placed on the complete system. With this minimal movement of the idler pulleys, the differential force is effectively provided in each leg portion 20, 21 of the support member 17, and the strain gauge 26 is very effective in providing the electrical signal proportional to the system torque. In a geometric sense, one of the idler rollers (roller 22) engages the belt such that the angle $\theta_1$ defined between the belt and a line 30 parallel to an imaginary line 31 connecting the pulley centers, is substantially equal to the angle $\theta_2$ defined where the other idler roller 23 engages the belt, between the belt and a line 32 parallel to the same imaginary line 31.

Of course components other than a strain gauge can be employed. As shown in FIG. 3, a translator 35 is provided, which includes a spring member 36 coupled to a rigid support member; the spring will be deflected as a function of the differential force developed during system operation. In addition a simple indicator 37 is coupled between the spring and the support member 17, to provide a visible indication of the spring deflection and thus signify the tension in the continuous strand as the system is displaced. Such spring-and-indicator units are well known and used for various force measuring applications.

Other torque-indicating units could be coupled to the support member 17 to provide a torque-indicating signal. For example, the piston of a hydraulic system can be coupled to support member 17 to provide a fluid pressure output signal. Such an arrangement is useful with structures such as an automatic transmission in a motor vehicle, where the gear shift is initiated from a fluid pressure signal.

The system has the advantage of being extremely simple, and there are no slip rings or other connections such as are frequently found in electrical systems to provide an electrical output signal. The system can be rapidly and easily installed on almost any belt driving system, or on chain systems. The accuracy of the output signal can be very high, being limited only by the particular force measuring system employed in conjunction with the idler rollers. At the present time it is believed that the best mode for practicing the invention includes operation of the structure shown in FIG. 1.

While only particular embodiments of the invention have been described and illustrated, it is manifest that various modifications and alterations may be made therein. It is therefore the intention in the appended claims to cover all such modifications and alterations as may fall within the true spirit and scope of the invention.

What is claimed is:

1. A measuring system for use with a power transmission system in which power is transferred from a driving member to the driven member by a continuous power transmission strand, which strand has a tensioned side and a slack side during power transmission, which measuring system comprises:
    a support member, having a base and a pair of legs extending at substantially right angles to the base, each of said legs defining a pair of spaced-apart openings;
    a pair of idler rollers, each having a support shaft extending into one of the openings in each of the support member legs, each idler roller supported to bear against the continuous strand and pinch together said tensioned and slack sides, such that displacement of the strand subjects the idler rollers to oppositely directed forces proportional to the respective tensions in said tensioned and slack sides and develops a differential force in each of the support member legs; and
    measuring means, coupled to the support member for subjection to the resultant of said oppositely directed forces, for providing a torque-indicating signal which varies as a function of the differential force developed.

2. A measuring system as claimed in claim 1, and in which the measuring means includes a strain gauge transducer, physically coupled to the base of the support member, and having a pair of output conductors for providing the torque-indicating signal as an electrical output signal.

3. A measuring system as claimed in claim 1, and in which the measuring means comprises a translator, having a spring member connected for deflection as a function of the differential force developed, and an indicator coupled between the spring member and the support member, to provide an indication of the spring deflection and thus signify the torque in the system.

4. A torque measuring system for use with a power transmission system in which power is transferred from a driving member to the driven member by a continuous power transmission belt, which belt has a tensioned side and a slack side during power transmission, which torque measuring system comprises:
    a U-shaped support member, having a base and a pair of legs extending upwardly at substantially right angles to the base, each of said legs defining a pair of spaced-apart openings, the support member being positioned approximately half-way between the pulleys;
    a pair of idler rollers, each having a support shaft extending into one of the openings in each of the support member legs, each idler roller being positioned to bear against the continuous belt and pinch together said tensioned and slack sides, such that displacement of the belt subjects the idler rollers to oppositely directed forces proportional to the respective tensions in said tensioned and slack sides and develops a differential force in each of the support member legs, one of the idler rollers engaging the belt such that the angle defined between the belt and a line parallel to an imaginary line connecting the pulley centers is substantially equal to the angle defined, where the other of the idler rollers engages the belt, between the belt and a line parallel to the same imaginary line, and
    a measuring unit, coupled to the support member base for subjection to the resultant of said oppositely directed forces, for providing a torque-indicating output signal, which signal varies as a function of the differential force developed in the support member legs.

5. A torque measuring system as claimed in claim 4, and in which the measuring unit includes a strain gauge transducer, physically coupled to the base of the support member, and having a pair of output conductors for providing the torque-indicating signal as an electrical output signal.

6. A torque measuring system as claimed in claim 4, and in which the measuring unit comprises a translator, having a spring member connected for deflection as a function of the differential force developed, and an indicator coupled between the spring member and the support member, to provide an indication of the spring deflection and thus signify the torque in the belt pulley system.

* * * * *